United States Patent
Lee et al.

(10) Patent No.: US 7,430,093 B2
(45) Date of Patent: Sep. 30, 2008

(54) SEEK CONTROL METHOD OF HARD DISK DRIVE, RECORDING MEDIUM STORING METHOD AND HARD DISK DRIVE ADOPTING METHOD

(75) Inventors: Jung-ho Lee, Suwon-si (KR); Da-woon Chung, Suwon-si (KR); Dong-wook Lee, Suwon-si (KR); Byoung-kul Ji, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 84 days.

(21) Appl. No.: 11/480,443

(22) Filed: Jul. 5, 2006

(65) Prior Publication Data
US 2007/0008646 A1 Jan. 11, 2007

(30) Foreign Application Priority Data
Jul. 5, 2005 (KR) .................... 10-2005-0060302

(51) Int. Cl.
*G11B 5/596* (2006.01)
(52) U.S. Cl. ................... 360/78.06; 360/78.08
(58) Field of Classification Search ............ None
See application file for complete search history.

(56) References Cited

U.S. PATENT DOCUMENTS 4,982,298 A * 1/1991 Volz et al. .............. 360/78.06
6,781,787 B1 * 8/2004 Codilian et al. ......... 360/78.06
7,061,714 B1 * 6/2006 Yu ......................... 360/78.07
2002/0054450 A1 * 5/2002 Chu et al. ................ 360/78.06
2005/0094309 A1 * 5/2005 Lee ......................... 360/78.06
2006/0268449 A1 * 11/2006 Chu et al. ............... 360/78.06

FOREIGN PATENT DOCUMENTS

| JP | 09-231698 | 9/1997 |
| JP | 2000-222843 | 8/2000 |
| JP | 2003-123414 | 4/2003 |

* cited by examiner

*Primary Examiner*—Jason C Olson
(74) *Attorney, Agent, or Firm*—Staas & Halsey LLP

(57) ABSTRACT

The present invention relates to a hard disk drive performing a seek control method using a multi-sinusoidal wave acceleration profile, where the seek control method is capable of coping with a variation in a voice coil motor driving current due to variances in a peripheral environment. The seek control method of the present invention includes: calculating a seek time scaling (STC) related to variations in a voice coil motor (VCM) driving current due to variation in a peripheral environment; calculating an acceleration distance ratio (ALR) of an acceleration distance to a maximum seek distance without a coast mode according to the STC; calculating position profiles in an acceleration mode, the coast mode and a deceleration mode, respectively, using both the STC and the ALR; and performing a seek operation by generating the VCM driving current according to the position profiles and applying the VCM driving current to a VCM.

6 Claims, 9 Drawing Sheets

SEEK CONTROL METHOD OF HARD DISK DRIVE, RECORDING MEDIUM STORING METHOD AND HARD DISK DRIVE ADOPTING METHOD

CROSS-REFERENCE TO RELATED APPLICATIONS

This application claims the benefit of Korean Patent Application No. 10-2005-0060302, filed on Jul. 05, 2005, in the Korean Intellectual Property Office, the disclosure of which is incorporated herein in its entirety by reference.

BACKGROUND OF THE INVENTION

1. Field of the Invention

The present invention relates to a hard disk drive performing a seek control method using a multi-sinusoidal wave acceleration profile, and more particularly, to a seek control method capable of coping with a variation in a voice coil motor driving current accompanying variances in a peripheral environment, a recording medium storing a program to execute the method, and a hard disk drive adopting the method.

2. Description of the Related Art

In general, a hard disc drive (HDD) includes a plurality of magnetic heads for writing and reading information by magnetizing a rotating disc and sensing a magnetic field from the disc. The information is stored on concentric tracks. Each track has a unique disc number and a track number. In a plurality of discs, tracks having the same track number are called a cylinder. Therefore each track can be defined by its cylinder number.

Each head (or transducer) is typically integrated into a slider assembled with a head gimbal assembly (HGA). Each HGA is attached to an actuator arm. The actuator arm has a voice coil that is located adjacent to a magnetic assembly which defines a voice coil motor (VCM) together. Further, the HDD includes a VCM driving circuit, which supplies a current for exciting the VCM, and a controller. The excited VCM rotates the actuator arm to move the head across the disc.

When writing or reading information, the HDD may perform a seek control routine for moving the head from one track to another. During the seek control routine, the VCM is excited to move the head from a certain track to a target track. The controller controls the current for exciting the VCM to move the head exactly to the target track.

It is preferable to minimize the time required to read or write information from or to discs. Therefore, the seek control routine performed by the HDD needs to move the head to the target track as quickly as possible. In addition, a settling time of the HGA should be minimized so that the head can write or read the information as quickly as possible.

In a conventional method, the seek control is performed to move the head to the target track using a square wave acceleration profile. Unfortunately, a square wave includes harmonic waves of high frequencies. These harmonic waves result in a mechanical resonance of an HGA, resulting in mechanical components or assemblies vibrating. In addition, residual vibration causes audible noise. Further, the mechanical resonance generated by the seek control method using the conventional square wave acceleration profile causes an increase in both the settling time required to write or read information on or from discs and the overall seek time.

To resolve this problem, a seek control method using a sinusoidal wave acceleration profile has been developed. A seek control method using the sinusoidal wave acceleration profile has advantages in terms of vibration and audible noise compared to the seek control method using the square wave acceleration profile. Nevertheless, the seek control method using a sinusoidal wave acceleration profile has disadvantages in that a seek time is increased by as much as 10% compared to the seek control method using the square wave acceleration profile. This is easily understood by comparing a sinusoidal wave and a square wave. An area under a sinusoidal wave is smaller than that occupied by a square wave. This area indicates the amount of current provided to accelerate or decelerate the VCM. Because the amount of current in the seek control method using a sinusoidal wave acceleration profile is smaller than that used in the seek control method using the square wave acceleration profile, the VCM has less momentum, and thus the seek time is longer when seeking the same distance.

A multi-sinusoidal wave seek control method has been developed to overcome this disadvantage. The multi-sinusoidal wave seek control method is disclosed in Korean Patent Publication Nos. 2001-62386, which was filed on Jul. 7, 2001, and 2001-67380, which was filed on Jul. 12, 2001. While the sinusoidal wave seek control method uses a single sinusoidal wave, the multi-sinusoidal wave seek control method uses a harmonic wave obtained by synthesizing at least two sinusoidal waves.

FIG. 1 is a diagram illustrating a multi-sinusoidal wave acceleration profile used in the multi-sinusoidal wave seek control method. The multi-sinusoidal wave acceleration profile is obtained by synthesizing a plurality of sinusoidal waves each having different frequencies. An acceleration period is depicted as being symmetrical to a deceleration period in FIG. 1. However, in most cases, the acceleration period and the deceleration period are asymmetrical. A main reason for the asymmetry is that the multi-sinusoidal wave acceleration profile is obtained by synthesizing at least two sinusoidal waves. The asymmetry also occurs because a ratio of the acceleration period to the deceleration period is varied in order to reduce the residual vibration of the mechanical components and to shorten the settling time. This is done by varying the synthesizing ratio of sinusoidal waves.

Typically, the seek control can be performed in an acceleration mode, a deceleration mode, and a coast mode in which the head coasts at a maximum speed for long distance seeking. In general, a maximum value of a current input to a VCM in the seek control is limited based on the performance and mechanical vibration of the VCM. That is, in the acceleration mode, the maximum speed to which the head is accelerated is limited according to the maximum current. Also, since an acceleration profile and a deceleration profile should be symmetrical if at all possible, the deceleration mode is performed when the head reaches the maximum velocity. Accordingly, a distance, which can be sought only with the acceleration mode and the deceleration mode, is limited. Therefore, the coast mode is necessary to seek a distance longer than a predetermined distance.

FIG. 2 is a diagram illustrating an acceleration profile for the multi-sinusoidal wave seek control method in which the coast mode is used. In the coast mode, a value of the current input to the VCM is 0. In detail, the head is accelerated by applying current to the VCM in the acceleration mode and when the velocity of the head is at a maximum, i.e., at a position A of FIG. 2, the acceleration mode ends and the coast mode begins by blocking the current input to the VCM. The head is not accelerated anymore and coasts at a maximum speed due to inertia. After coasting a predetermined distance, the coast mode ends and the deceleration mode begins at a position B. In the deceleration mode, the velocity of the head is decelerated by applying opposite current to the VCM. Accordingly, the head stops on the target track. For accurate seek control, the conversion to the coast mode and the conversion to the deceleration mode should be precisely controlled. Accurate control is more important when considering that the head moves at the maximum speed in the coast mode.

FIG. 3 is an equivalent circuit of the VCM. Referring to FIG. 3, the VCM can be represented by a coil resistor Rm and a coil inductor Lm. The resistance of the coil resistor Rm is strongly dependent on temperature.

Variation in the coil resistance of the coil resistor Rm according to a variation in temperature results in variation in current through the VCM, and thus the variation in temperature should be considered in the seek control.

If temperature increases or power supplied to a VCM driving unit varies, then the HDD using a single sinusoidal wave seek method cannot generate a desired maximum VCM driving current. Accordingly, a waveform of a current for seek control deteriorates, resulting in a malfunction or a delay in a seek operation. To solve such a problem, a conventional method of adaptively varying the waveform of current in response to variations in peripheral environments, for instance, variations in both temperature and voltage, has been used. Malfunction and delay in seek operations are prevented by calculating a variation ratio of the VCM driving current, i.e., a seek time scaling (STC), according to variations in temperature and VCM driving power, and varying the waveform of the VCM driving current accordingly.

Nevertheless, it is more difficult for the HDD using the multi-sinusoidal wave seek control method to adaptively cope with the variations in temperature and VCM driving power using the STC than the single sinusoidal wave seek control method. This is because, unlike in the single sinusoidal wave seek control method, an acceleration period is not symmetrical to a deceleration period in the multi-sinusoidal wave seek control method, and thus it is difficult to adapt the STC uniformly.

The complexity in seek control increases further in the multi-sinusoidal wave seek control using a coast mode because a distance for coasting varies according to the variation in the VCM driving current.

In a long distance seek operation, it is sufficient to consider only the variation in the VCM driving current presented by the STC in the single sinusoidal wave seek control because an acceleration period, a deceleration period, an acceleration distance, a deceleration distance, etc. have a linear relationship with the VCM driving current.

However, other parameters besides the variation in a maximum VCM driving current represented by the STC should be considered in the multi-sinusoidal wave seek control because a coast speed is only determined linearly with respect to the VCM driving current. The acceleration period, the deceleration period, the acceleration distance, the deceleration distance etc., all depend on additional parameters.

SUMMARY OF THE INVENTION

Additional aspects and/or advantages of the invention will be set forth in part in the description which follows and, in part, will be apparent from the description, or may be learned by practice of the invention.

An object of the present invention is to provide a multi-sinusoidal wave seek control method adapting to variation in a VCM driving current resulting from variation in a peripheral environment.

Another object of the present invention is to provide a computer-readable recording medium having a program to execute the method recorded thereon.

Still another object of the present invention is to provide an HDD adopting the method.

According to an aspect of the present invention, there is provided a seek control method of an HDD using a multi-sinusoidal wave acceleration profile, the method including: calculating a seek time scaling (STC) related to variation in a voice coil motor (VCM) driving current according to variation in a peripheral environment; calculating an acceleration distance ratio (ALR) of an acceleration distance to a maximum seek distance without a coast mode according to the STC; calculating position profiles in an acceleration mode, the coast mode and a deceleration mode, respectively, using both the STC and the ALR; and performing a seek operation by generating the VCM driving current according to the position profiles and applying the VCM driving current to a VCM.

Preferably, the seek control method further includes: calculating a coast speed and a coast period using both the STC and the ALR, wherein the calculating of the position profiles comprises calculating the position profiles in an acceleration mode, a coast mode and a deceleration mode using the acceleration period, an acceleration distance, a coast speed and a coast period.

According to another aspect of the present invention, there is provided a computer-readable recording medium having a program to execute the seek control method recorded thereon, the method including: calculating a seek time scaling (STC) related to variation in a voice coil motor (VCM) driving current according to variation in a peripheral environment; calculating an acceleration distance ratio (ALR) of an acceleration distance to a maximum seek distance without a coast mode according to the STC; calculating position profiles in an acceleration mode, the coast mode and a deceleration mode, respectively, using both the STC and the ALR; and performing a seek operation by generating the VCM driving current according to the position profiles and applying the VCM driving current to a VCM.

According to still another aspect of the present invention, there is provided an HDD suitable to the seek control method, the HDD including: a disk storing information; a spindle motor rotating the disk; a head reading information from the disk; a voice coil motor (VCM) driving unit driving a VCM to move the head across the disk; a temperature & voltage detection unit detecting operational temperature and supply voltage for the hard disk drive; and a controller generating a VCM driving current to drive the VCM based on multi sinusoidal wave acceleration profile corresponding to a seek distance. The controller performs a seek control method including: calculating a seek time scaling (STC) related to variation in a voice coil motor (VCM) driving current according to variation in a peripheral environment; calculating an acceleration distance ratio (ALR) of an acceleration distance to a maximum seek distance without the coast mode according to the STC; calculating position profiles in an acceleration mode, a coast mode and a deceleration mode, respectively, using both the STC and the ALR; and performing a seek operation by generating the VCM driving current according to the position profiles and applying the VCM driving current to a VCM.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
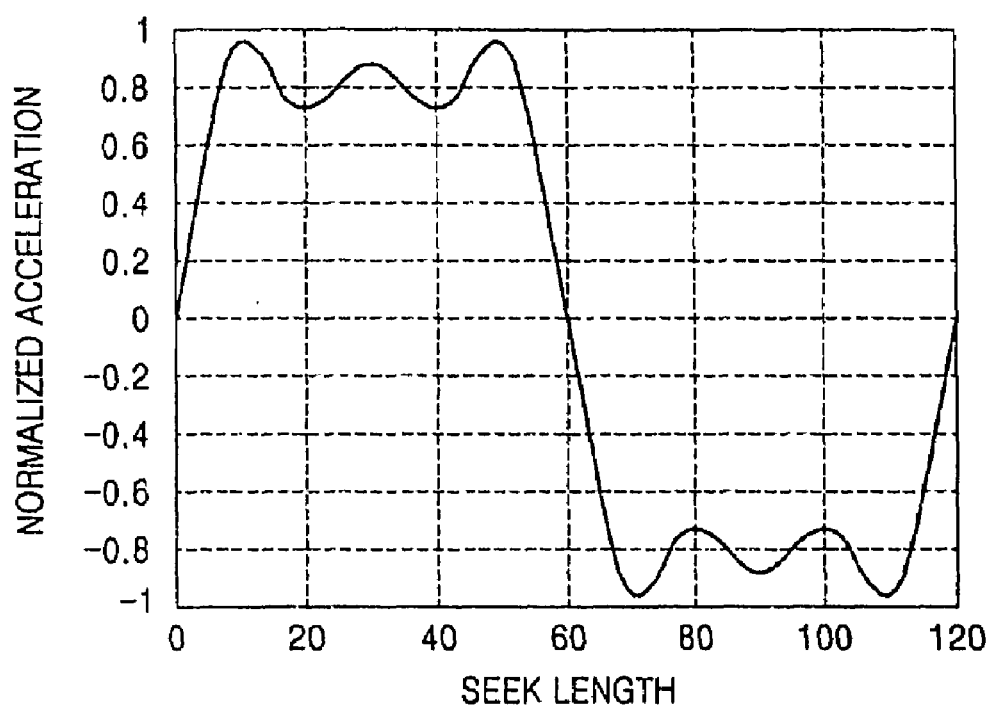
FIG. 1 is a diagram illustrating a multi-sinusoidal wave acceleration profile used in a multi-sinusoidal wave seek control method.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 4:
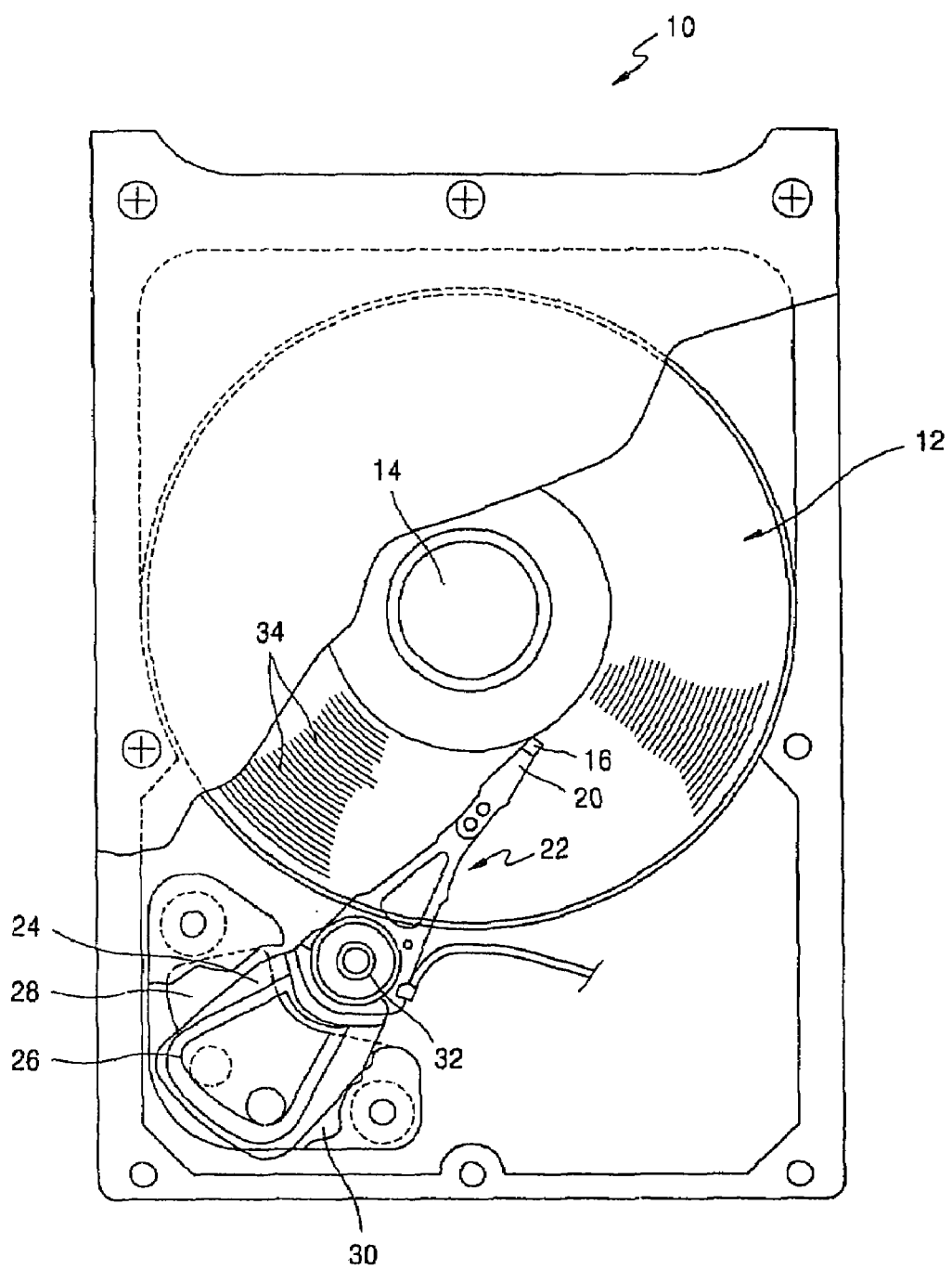
FIG. 4 is a partial sectional view of a hard disk drive.

FIG. 4 is a partial sectional view of a hard disk drive 10. The hard disk drive 10 includes at least one magnetic disk 12, which is rotated by a spindle motor 14. In addition, the disk drive 10 includes a head 16 located adjacent to a surface of the disk 12.

The head 16 can write and read information on the magnetic disk 12 by magnetizing the magnetic disk 12 and sensing the magnetic field of the magnetic disk 12, respectively. Typically, the head 16 is associated with the magnetic disk 12. Although a single head 16 is shown and described, it should be understood that the head is divided into a write head for magnetizing the magnetic disk 12 and a separate read head for sensing the magnetic field of the magnetic disk 12. The read head may be made of a magneto-resistive (MR) material.

The head 16 may be integrated with a slider 20. The slider 20 may be structured to create an air bearing between the head 16 and the surface of the disk 12. The slider 20 may be incorporated into an HGA 22. The HGA 22 may be attached to an actuator arm 24, which has a voice coil 26. The voice coil 26 may be located adjacent to a magnet assembly 28 to define a VCM 30. A current applied to the voice coil 26 generates a torque for rotating the actuator arm 24 about a bearing assembly 32. Rotation of the actuator arm 24 moves the head 16 across the disk 12.

Information is typically stored in circular tracks 34 of the magnetic disk 12. Each track 34 may have a plurality of servo sectors and a plurality of data sectors. Each servo sector includes a gray code, which identifies the track (cylinder). The head 16 is moved across the magnetic disk 12 to write or read information stored in another track. The movement of the head between different tracks is generally referred to as a seek routine.

Figure 5:
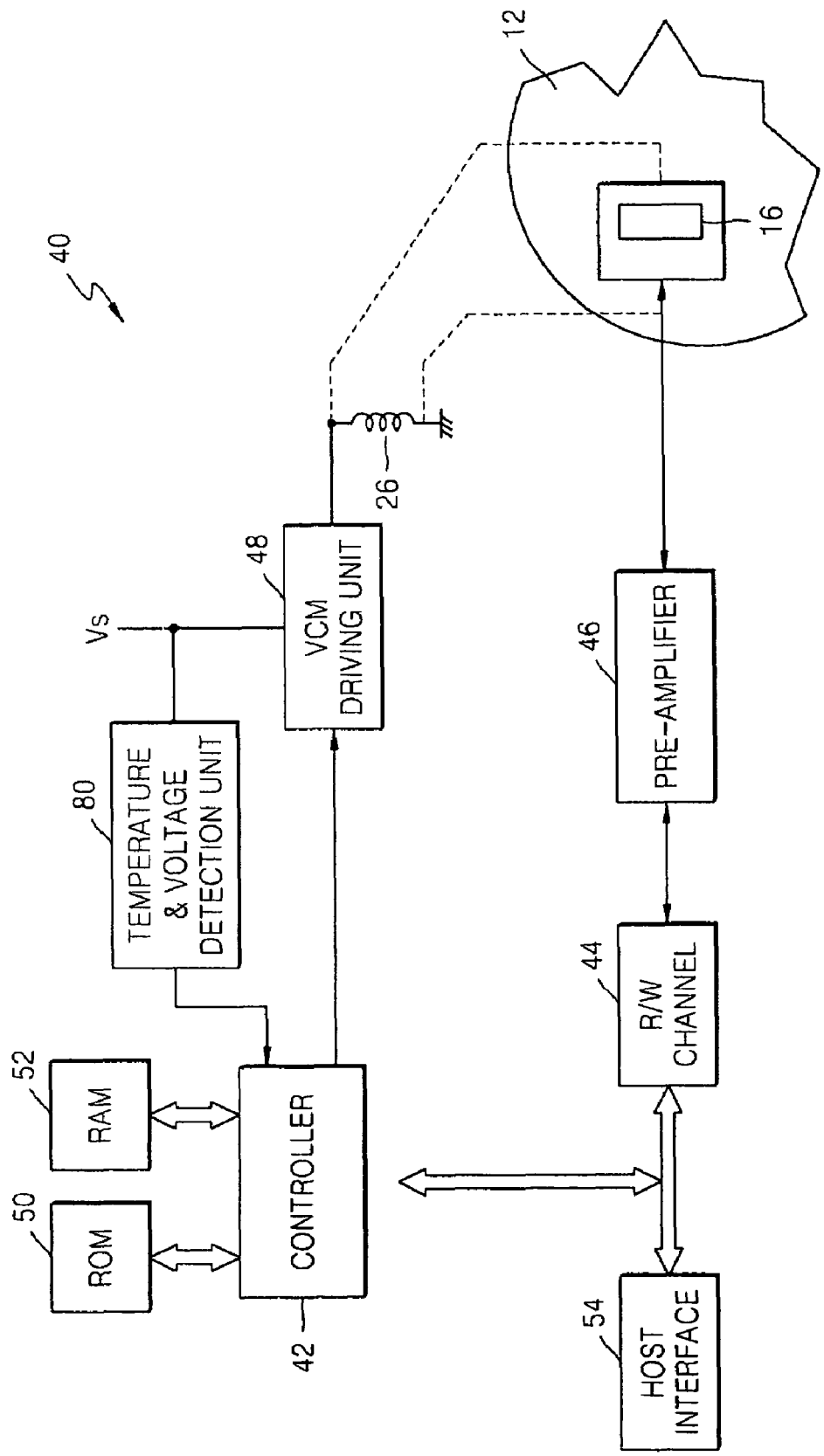
FIG. 5 is a block diagram of an electrical system for controlling the HDD shown in FIG. 4.

FIG. 5 is a block diagram of an electrical system 40 for controlling the HDD 10 shown in FIG. 4. Referring to FIG. 5, the electrical system 40 includes a controller 42 connected to the head 16 through a read/write (R/W) channel 44 and a pre-amplifier 46. The controller 42 may be a digital signal processor (DSP), a microprocessor, or a micro-controller. The controller 42 outputs a control signal to the read/write channel 44 in order to read or write information from or on the disc 12. The information is transmitted from the read/write channel 44 to a host interface 54. The host interface 54 includes a buffer memory (not shown) and a control circuit (not shown) for interfacing with a system such as a personal computer (PC).

The controller 42 is connected to a VCM driving unit 48 for supplying a VCM driving current to the voice coil 26. The controller 42 outputs a control signal to the VCM driving unit 48 in order to control excitation of the VCM 30 and the motion of the head 16.

The controller 42 is connected to a nonvolatile memory 50, such as a read-only memory (ROM) or a flash memory, and a random access memory (RAM) 52. The memories 50 and 52 store execution codes and data used by the controller 42 to perform software routines. A seek control routine of moving the transducer 16 from one track to another is one of the software routines. The seek control routine includes a servo control routine for guaranteeing that the transducer 16 is moved to a track exactly. As an example, execution codes for performing the seek control method illustrated in FIG. 11 described below may be stored in the ROM 50.

The ROM 50 stores various commands and data used by the controller 42 to perform software routines, including the seek control routine for moving the head 16 from one track to another track. In addition, for example, the ROM 50 can store equations used to generate position, velocity, and acceleration profiles.

In particular, the ROM 50 stores a first table including an STC representing variations in a VCM driving current according to variations in a peripheral environment and a second table for storing ratios between the STC and an acceleration period. The first and second tables will be described in detail later.

The RAM 52 stores information necessary for initially driving the disk drive. The information stored in the RAM 52 is read from the ROM 50 or the magnetic disk 12.

The temperature & voltage detection unit 80 periodically detects supply power Vs to the HDD 10 and the operational temperature of the HDD 10. Although the temperature & voltage detection unit 80 is not shown in detail, the temperature & voltage detection unit 80 may be constructed to detect supply power Vs using a voltage divider circuit and an analog/digital converter. Supply power Vs detected by the temperature & voltage detection unit 80 may be either supply power for the VCM 30 or supply power for a power amplifier (not shown) of the VCM driving unit 48.

The controller 42 analyzes commands received through the host interface 54 from a host system (not shown) and controls operations corresponding to the result of command analysis. The controller 42 applies a control signal to the VCM driving unit 48 to control excitation of the VCM 30 and motion of the head 16.

The general operation of the hard disk drive will now be described.

In a data read mode of the HDD 10, the read head of the head 16 senses a magnetic field from the magnetic disk 12 and produces a corresponding electric signal. The pre-amplifier 46 preamplifies the electrical signal. Next, in the read/write channel 44, an automatic gain control circuit (not shown) performs gain control on the preamplified signal to amplify the preamplified signal up to a predetermined level. The amplified signal, that is an analog signal, is encoded into a digital signal so that the signal can be read by a host system. In addition, the digital signal is converted into a data stream. The data stream is temporarily stored in a buffer(not shown), and then transmitted to the host system through the host interface 54.

In a data write mode of the HDD 10, data is received from the host system through the host interface 54 and temporarily stored in a buffer (not shown). The data stored in the buffer is sequentially output and converted into a binary data stream (suitable for the write channel) by the read/write channel 44. Next, the write head of the head 16 writes data to the magnetic disk 12 by using a write current amplified by the pre-amplifier 46.

The seek control method according to an embodiment of the present invention executed by the controller 42, will now be described in detail.

When a seek command is input, the controller 42 determines a standard seek time according to a seek distance based on a standard supply voltage Vo initially determined using the first table stored in the ROM 50, determines the STC corresponding to a difference between the standard supply voltage Vo and the voltage detected by the temperature & voltage detection unit 80 using the second table stored in the ROM 50, calculates a final seek time by multiplying the STC and the standard seek time, generates position, velocity and acceleration profiles based on the calculated final seek time, and controls the driving current of the VCM 30.

Figure 6:
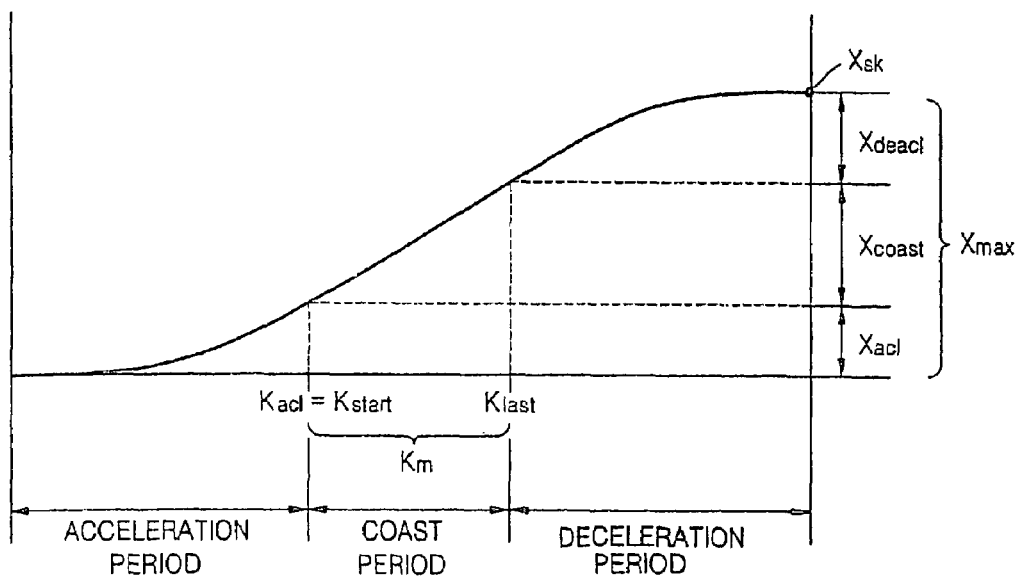
FIG. 6 is a graph of position versus time for the seek control when a coast mode is used.

FIG. 6 is a graph of position versus time for the seek control when the coast mode is implemented.

In FIG. 6, the position profile during a coast period is shown as a straight line, since movement during the coast period is constant at the speed that was accelerated to in the acceleration period.

The coast mode begins after the acceleration period, and the deceleration mode begins after a coasting distance is reached.

Figure 7:
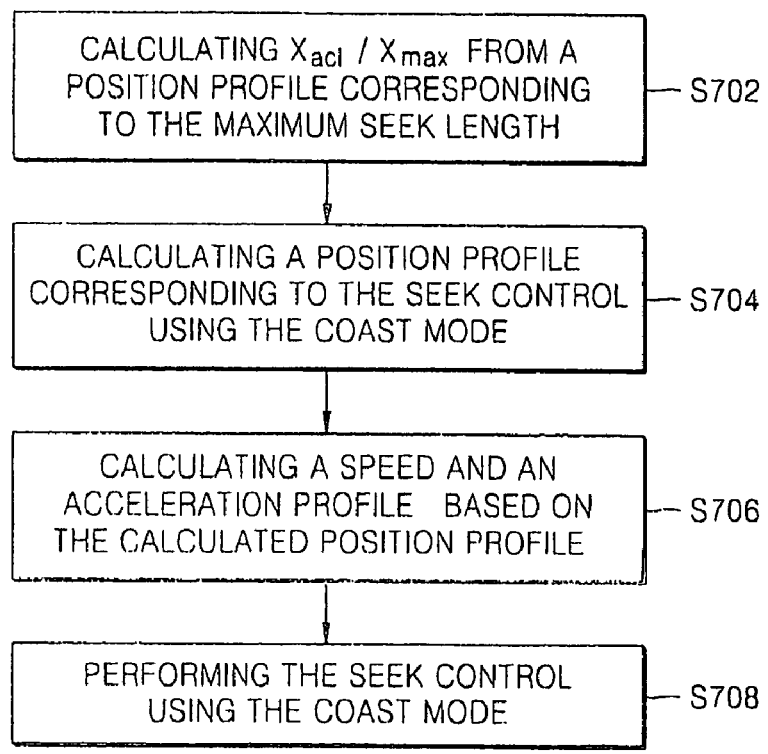
FIG. 7 is a flowchart illustrating a conventional seek control method of an HDD.

FIG. 7 is a flowchart illustrating a conventional seek control method of an HDD.

Before performing seek control using the coast mode, by using an acceleration profile, a velocity profile and a position profile, a ratio of an acceleration distance (Xacl) traveled during the acceleration period to a maximum seek distance (Xmax) that can be traveled without using the coast mode, is determined.

Figure 8:
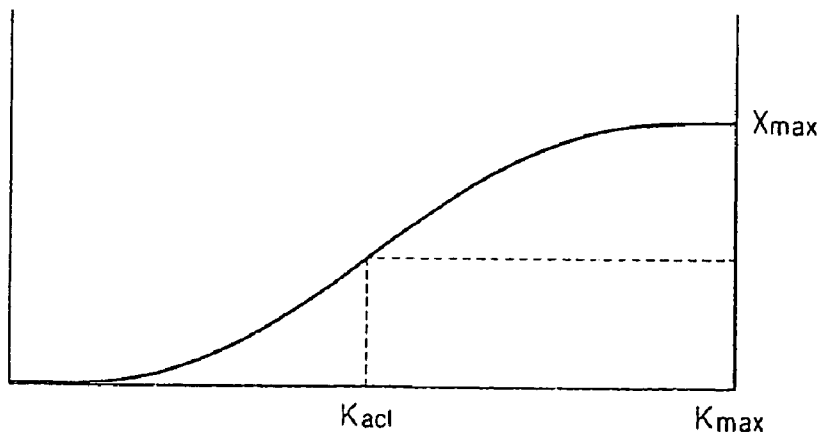
FIG. 8 is a graph of position versus time illustrating a maximum seek distance which can be traveled without using the coast mode.

FIG. 8 is a graph of position versus time illustrating the maximum seek distance (Xmax), which can be traveled without using the coast mode.

The ratio of the acceleration distance (Xacl) traveled during the acceleration period to the maximum seek distance (Xmax) is obtained from the position profile corresponding to the maximum seek distance in operation S702.

The acceleration period (Kacl) is obtained using the ratio (Xacl/Xmax).

Here, Kacl=Kmax*Xacl/Xmax, where Kmax is a maximum seek time, i.e., a seek time corresponding to the maximum seek distance (Xmax) that can be traveled without using the coast mode.

Figure 2:
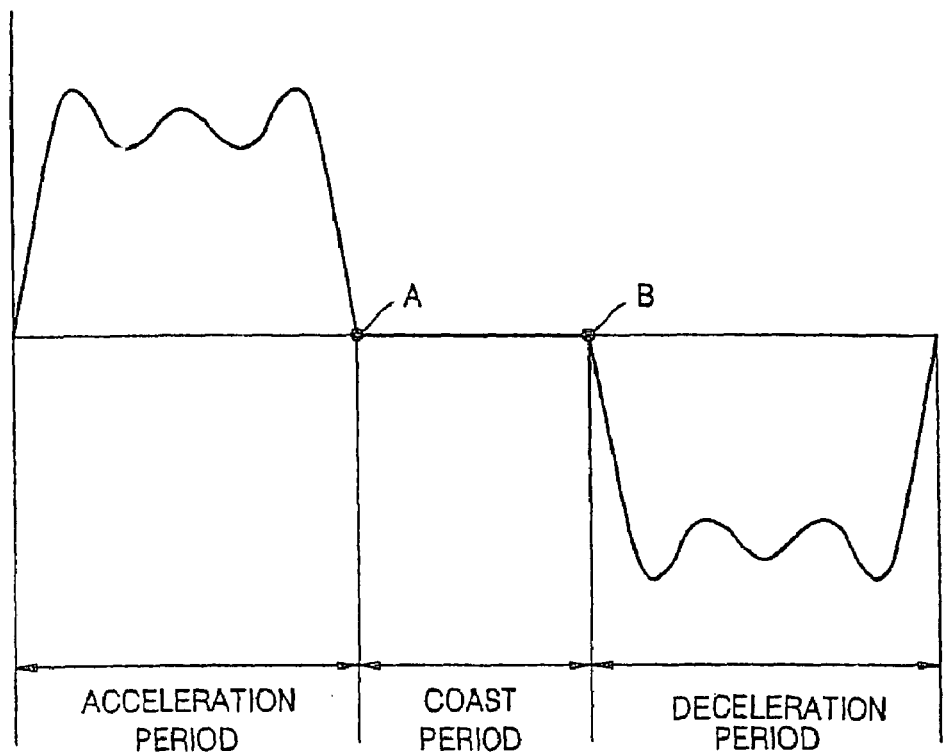
FIG. 2 is a diagram illustrating an acceleration profile for the multi-sinusoidal wave seek control method in which a coast mode is used.
Figure 3:
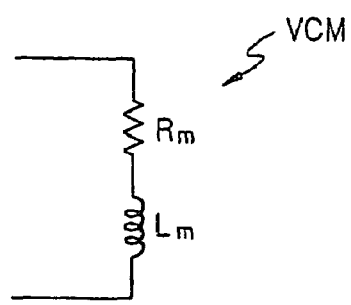
FIG. 3 is an equivalent circuit of a VCM.

The acceleration period (Kacl), which is the time of the acceleration period, corresponds to the period A of FIG. 2 and can be represented by the order of servo samples. A head passes tracks while traveling during seeking, and the position of the head is confirmed by sampling the servo samples recorded on the tracks at constant time intervals Ts.

A position profile for the seeking using the coast mode is calculated in operation S704.

1) The position profile during the acceleration period is obtained from Equation 1.

$$x*(k) = X_0^* k + \sum_{n=1}^{N} X_{C,n}^* \left[1 - \cos\left(\frac{2\pi}{P_n}k\right)\right] - \sum_{n=1}^{N} X_{S,n}^* \sin\left(\frac{2\pi}{P_n}k\right) \quad \text{[Equation 1]}$$

Here, the former summation is a cosine series and the latter summation is a sine series, and $X_0^*$ is a coefficient. Also, n (n=1, N) is an index indicating one of the harmonic waves used to generate a multi-sinusoidal wave, $P_n$ is a period of the sinusoidal wave, and k denotes the order of the servo samples, i.e., an elapsed time.

The time k=Kacl−1 is the end time for the acceleration mode. Therefore, the position when the coast mode begins can be obtained by substituting k=Kacl−1 into Equation 1.

2) The position profile in the coast mode is obtained as follows.

The position at a first Ts: Xstart; $X^*(k_{acl})$
The position at a second Ts: Xstart+1; $X^*(k_{acl})$+Xcoast/Km
The position at a third Ts: Xstart+2; $X^*(k_{acl})$+2*Xcoast/Km
...
The position at a last Ts: Xlast; $X^*(k_{ac})$+Xcoast Here, Xcoast denotes a coast distance, that is, the distance traveled during the coast period, Km denotes a coast period represented as the number of servo samples. The coast distance (Xcoast) is equal to Xsk−Xmax, where Xsk denotes a seek distance, that is, a distance to be traveled during the seeking using the coast mode.

The coast period ends at Kacl+Km, the deceleration period (Kdecel) begins at Kacl+Km+1.

3) The position profile in the deceleration period is obtained from Equation 2.

$$x*(k) = X_{coast} + X_0^*(k - K_{coast}) + \sum_{n=1}^{N} X_{C,n}^* \left[1 - \cos\left(\frac{2\pi}{P_n}k\right)\right] - \sum_{n=1}^{N} X_{S,n}^* \sin\left(\frac{2\pi}{P_n}k\right) \quad \text{[Equation 2]}$$

In operation S706, an acceleration profile and a velocity profile are obtained from the position profile obtained in operation S704.

In operation S708, the seek control using the coast mode is performed using the acceleration profile, the velocity profile, and the position profile obtained in operations S704 and S706.

Figure 9:
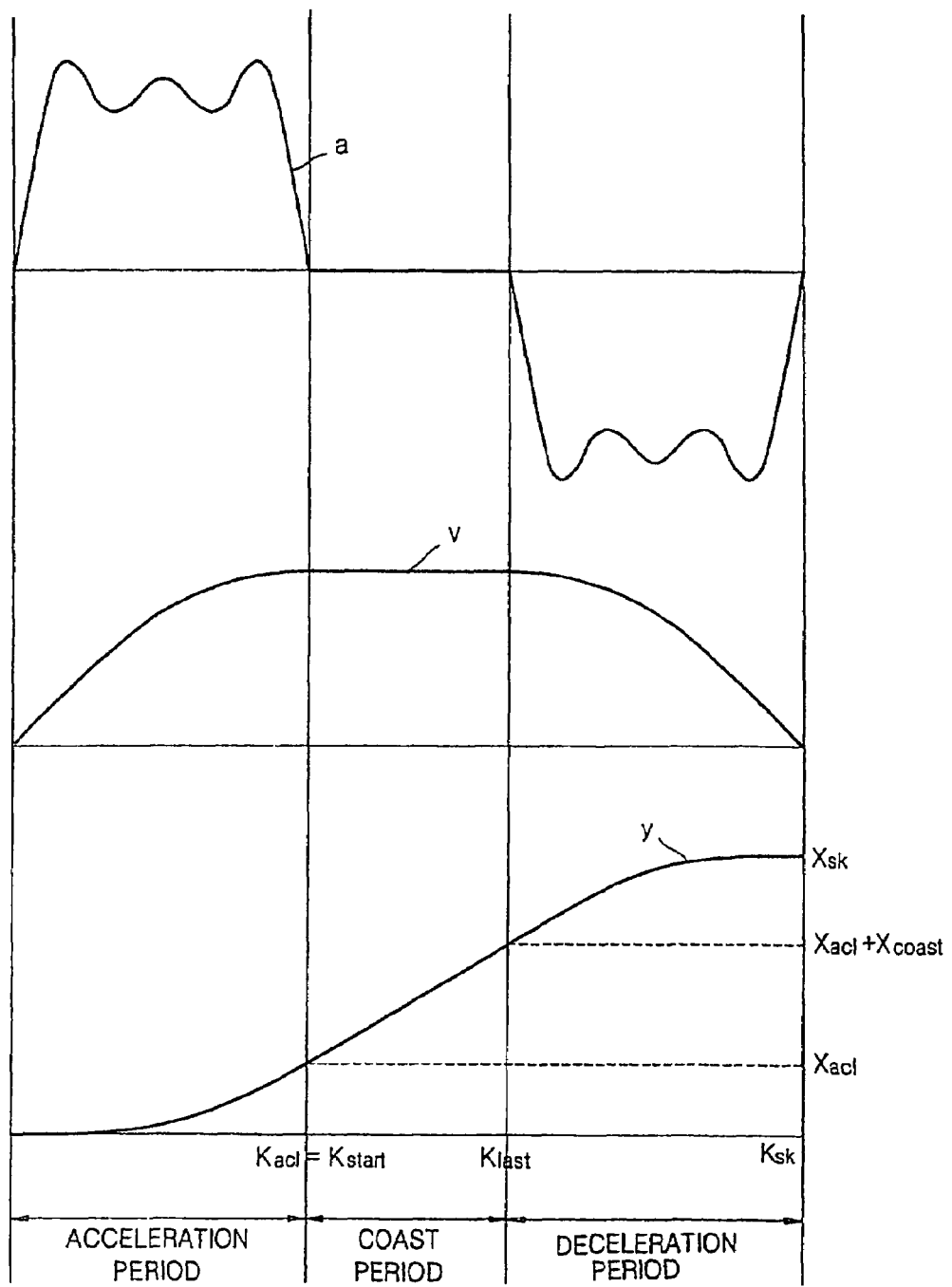
FIG. 9 is a graph of acceleration versus time, velocity versus time and position versus time for the seek control using the coast mode.

FIG. 9 is a graph a of acceleration versus time, a graph v of velocity versus time, and a graph y of position versus time for the seek control using the coast mode. The graph y shown in FIG. 9 is obtained in operation S704.

Referring to the position profile related to the maximum seek distance, which is a distance traveled without using a coast mode, the ratio of the distance traveled during the acceleration period to the maximum seek distance is determined, and the acceleration period is calculated by the ratio.

An exact position profile for a seek control using the coast mode can be obtained from the acceleration period and the coast distance.

In a multi-sinusoidal wave seek control using the coast mode, the speed in the coast mode is linear with respect to the VCM driving current, and the acceleration period, the deceleration period, the acceleration distance, the deceleration distance, etc. are not.

Accordingly, even though the VCM driving current is adaptively adjusted according to the variations in temperature and supply power, the acceleration period, the deceleration period, the acceleration distance, the deceleration distance, etc. are determined based on other parameters.

According to an embodiment of the present invention, it is possible to cope with variances in the peripheral environment, such as variations in temperature, variations in supply power, etc., by calculating a coast distance based on a coast speed, which is linear with respect to the VCM driving current, and obtaining position profiles in the acceleration mode, the coast mode and the deceleration mode, respectively, based on the coast distance.

The present invention utilizes the fact that the coast distance varies in accordance with the variation in the VCM driving current.

Figure 10:
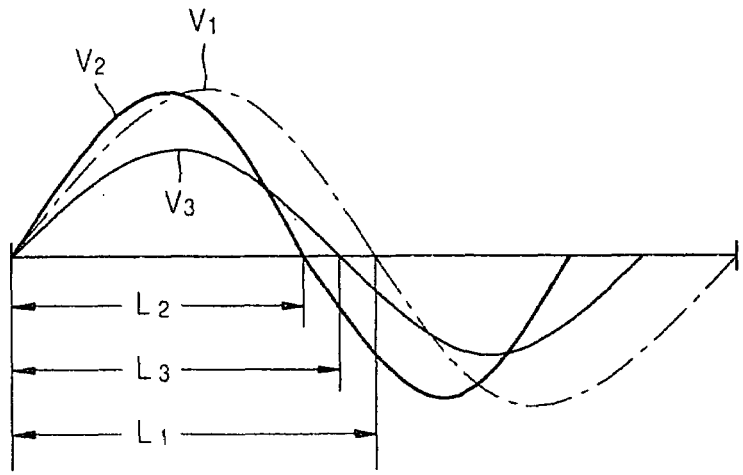
FIG. 10 shows a graph illustrating the acceleration period according to variations in the maximum VCM driving current measured on the maximum seek distance when the coast mode is not used.

FIG. 10 shows a graph illustrating variations in the acceleration period according to variations in the maximum VCM driving current, which is measured in the condition of the maximum seek distance without using the coast mode.

The maximum seek distance in the single sinusoidal wave seek control method can be achieved if the head moves at the maximum speed, at least for a time. Thus, the VCM should be driven by a maximum VCM driving current in the acceleration mode, at least for a time. However, if the maximum VCM driving current differs from a designed value, the maximum speed of the head varies, and therefore the distance traveled in the acceleration distance varies. Here, the variation in the acceleration distance with respect to the variation in the VCM driving current can be represented by a ratio between the maximum seek distance and the acceleration distance, that is an acceleration distance ratio ALR.

The acceleration distance in the multi-sinusoidal wave seek control method is not linear with respect to the VCM driving current due to the fact that, in the multi-sinusoidal wave seek control method, the VCM driving current does not vary linearly during the acceleration period as shown in FIG. 1.

Referring to FIG. 10, it can be understood that the ALR varies according to the variation in the STC. When the VCM driving current differs from the designed value due to the variations in temperature and supply power, the maximum seek distance and the acceleration distance differ from the respective designed values. The maximum seek distance varies linearly with respect to the STC, whereas the acceleration distance varies non-linearly with respect to the STC.

For example, if temperature increases due to increase of the coil resistance Rm of the VCM, or if supply power decreases, the designed maximum VCM driving current cannot be achieved.

The speed of the head in a seek control using a coast mode should be maximized as the acceleration mode ends. However, because the VCM driving current differs from the designed value according to the variation in temperature, the acceleration distance differs from its designed value.

Referring to FIG. 10, when the maximum of the VCM driving currents vary to V1, V2 and V3, the acceleration distances vary to L1, L2, and L3, respectively. Accordingly, it is seen that end times are different according to various conditions V1, V2 and V3. The ALR is determined as a ratio between the acceleration period and the deceleration period, and is dependent on the STC.

Figure 11:
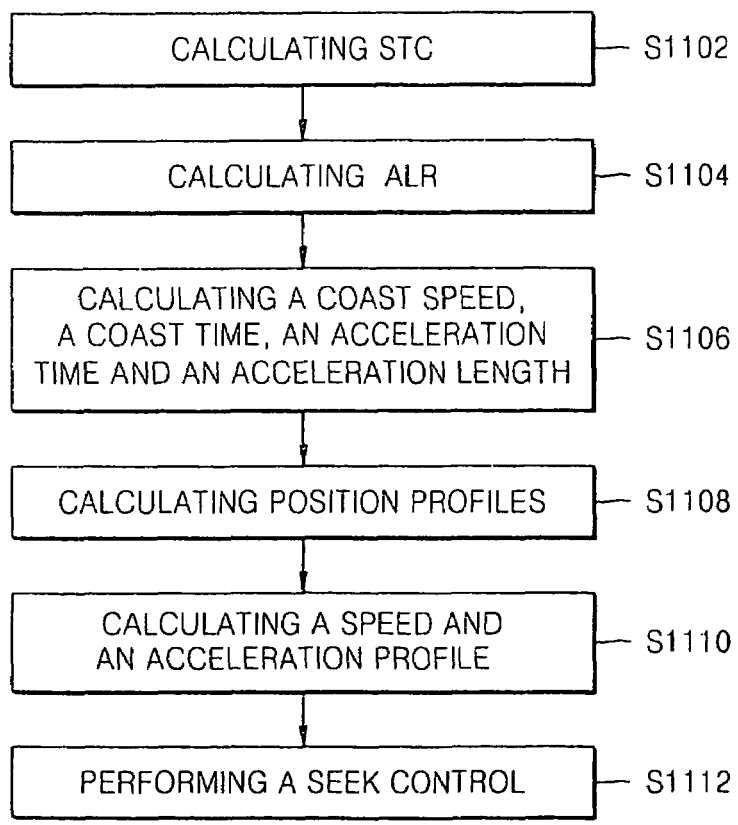
FIG. 11 is a flowchart illustrating the seek method according to an embodiment of the present invention.

FIG. 11 is a flowchart illustrating the seek method according to an embodiment of the present invention.

First, the STC, which represents a ratio of the VCM driving current according to variations in the peripheral environment such as temperature, supply power, etc., is calculated in operation S1102.

The ALR according to the STC is calculated in operation S1104. The ALR can be obtained by calculating or measuring the variation in the acceleration period while varying the STC.

With reference to the STC obtained in operation S1102 and the ALR obtained in operation S1104, parameters required for the seek control using the coast mode are calculated in operation S1106. The required parameters are the coast speed, the coast period, the acceleration period and the acceleration distance.

The coast speed Vcoast is determined as follows.

$$V\text{coast} = V\text{coast\_org}/STC$$

Vcoast_org indicates the designed coast speed, that is, the coast speed when variations in the peripheral environment are not considered. The head travels at the maximum speed in the coast mode, and the maximum speed is determined by the maximum VCM driving current. The maximum VCM driving current varies with respect to the STC, and thus, the coast speed (Vcoast) varies linearly with respect to the STC as well.

The coast period (Kcoast) is determined as follows.

$$K\text{coast} = (X\text{sk} - X\text{max})/V\text{coast}$$

Here, Xsk is a seek distance, that is, a distance to travel, and Xmax is the maximum seek distance, that is, the maximum distance traveled when the coast mode is not used.

Further, the acceleration period (Kacl) and the deceleration period (Kdecel) are determined, respectively, as follows.

$$K\text{acl} = K\text{max} * STC * ALR$$

$$K\text{decel} = K\text{max} * STC - K\text{acl}$$

Here, the maximum seek time (Kmax) is the time corresponding to the maximum seek distance (Xmax).

The coast distance (Xcoast) and a difference between the coast distance (Xcoast) and the seek distance (Xsk), that is Xexp_coast, are determined as follows.

$$X\text{coast} = V\text{coast} * K\text{coast}$$

$$X\text{exp\_coast} = X\text{sk} - X\text{coast}$$

The acceleration distance (Xacl) is determined as follows.

$$X\text{acl} = X\text{exp\_coast} * ALR$$

Position profiles in the acceleration mode, the coast mode and the deceleration mode are calculated in operation S1108 from the acceleration period (Kacl), the acceleration distance (Xacl), the coast speed (Vcoast), and the coast period (Kcoast).

In detail, position profiles in the acceleration mode, the coast mode and the deceleration mode are calculated by inserting the acceleration period (Kacl), the acceleration distance (Xacl), the coast speed (Vcoast) and the coast period (Kcoast), which are calculated by considering both the STC and the ALR, into Equations 1 and 2, as described in operation S704 in FIG. 7.

1) Position Profile in the Acceleration Mode

Last Acceleration mode position = $x*(K\text{acl}-1)$

Where LastAcceleration mode position signifies a final position in the acceleration mode and $x*(k)$ is given by Equation 1.

2) Position Profile in the Coast Mode
1st Coast mode position=Xacl
2nd Coast mode position=Xacl+Vcoast
Last Coast mode position=Xacl+Kcoast*Vcoast
3) Position Profile in Deceleration Mode
1st Deceleration mode position=x*(Kacl+Kcoast+1)
Where x*(Kacl+Kcoast+1) is given by Equation 2.

In operation S1110, velocity and acceleration profiles are calculated using position profiles calculated in operation S1108.

A long distance seek in which the coast mode is used is performed by generating the adjusted VCM driving current according to the position profile, the velocity profile and the acceleration profile, and applying the adjusted VCM driving current to the VCM in operation S1112.

Upon receiving a seek command, the controller 42 controls the VCM driving current by determining the STC according to the peripheral environment such as temperature, supply power, etc. using the first table stored in the RAM 52, determining the ALR according to the determined STC using the second table stored in the RAM 52, and sequentially generating position, acceleration and acceleration profiles based on both the STC and the ALR.

Figure 12:
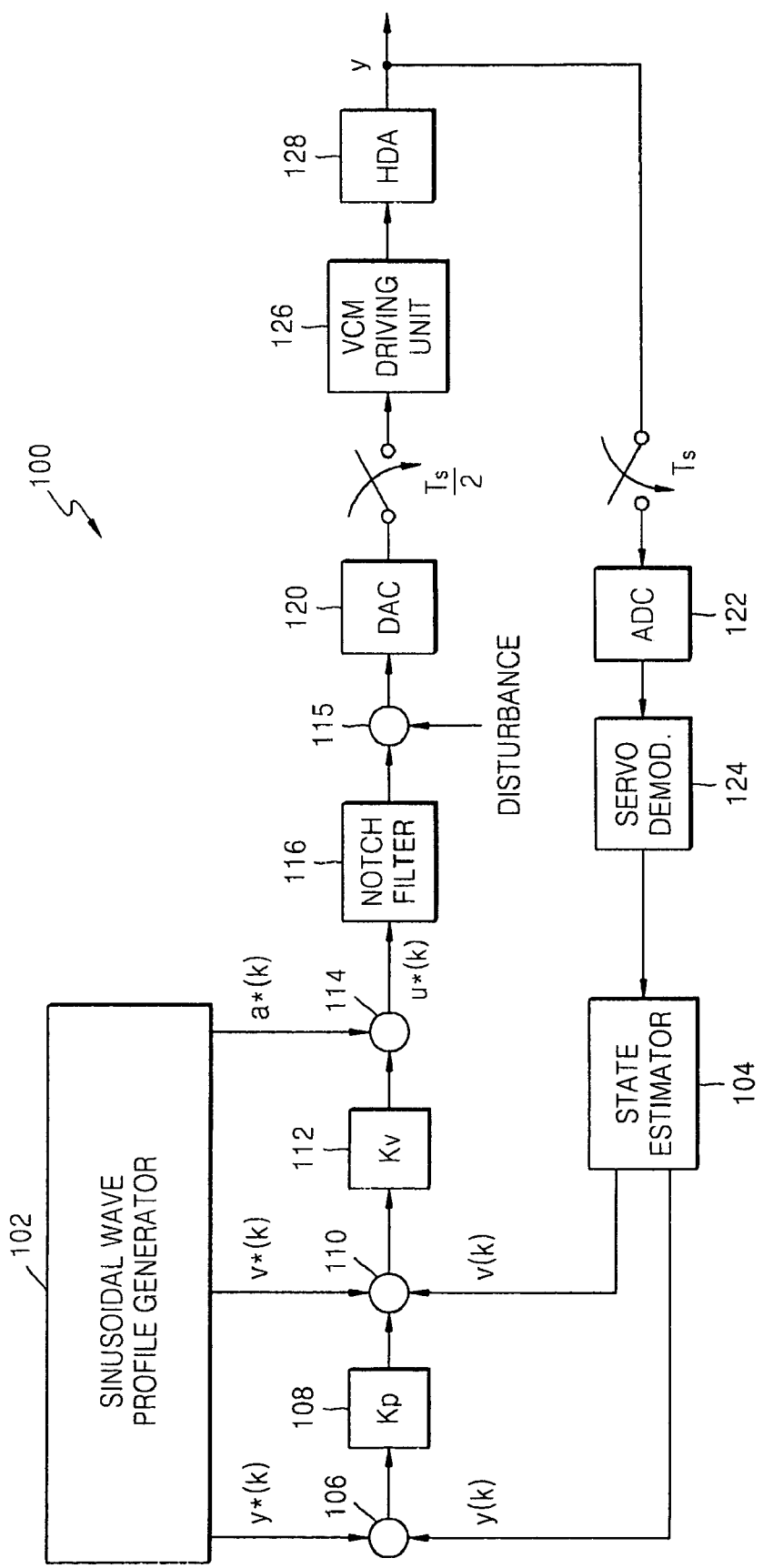
FIG. 12 is a block diagram of a seek control system implemented by the controller shown in FIG. 5.

FIG. 12 is a block diagram of a seek control system 100 controlled by the controller 42 shown in FIG. 5. The seek control system 100 includes a sinusoidal wave profile generator 102, a notch filter 116, a VCM driving unit 126, an HDA 128, and a state estimator 104. FIG. 12 further includes a digital-to-analog converter (DAC) 120, an analog-to-digital converter (ADC) 122, and a servo demodulator 124. The seek control system 100 performs a seek control routine to move the head 16 from a track to a target track spaced with the seek distance Xsk therebetween.

Every time the head 16 reads out the gray code of one of the tracks 34 after a sampling period Ts, the sinusoidal wave profile generator 102 generates position y*(k), velocity v*(k) and acceleration a*(k) profiles.

In a long distance seek in which the coast mode is used, the sinusoidal wave profile generator 102 generates position y*(k), velocity v*(k) and acceleration y(k) profiles by adaptively applying both the STC and the ALR according to variations in the peripheral environment as shown in FIG. 11.

To obtain a sine function and a cosine function, which are necessary to generate a sinusoidal wave acceleration profile, the sine and cosine functions sampled with a sampling period Ts are stored in the ROM table (not shown). The stored sine and cosine functions are read out in synchronization with a sampling period Ts.

A state estimator 104 outputs an estimated position y(k) and an estimated velocity v(k) of the head 16 considering previous samples (k−1, k−2,) and a current sample (k).

The position of a track, that is, the track number, can be identified from gray codes recorded in servo sectors, which the head 16 reads while moving across the disk 12. Gray codes read by the head 16 are provided to the state estimator 104. In FIG. 12, numerals 106, 110, 114 and 115 signify adders, and particularly adder 115 signifies an addition operation between an output of the notch filter 116 and disturbance. Further, numerals 108 and 112 signify multipliers for an acceleration coefficient and a velocity coefficient, respectively.

The present invention can be realized as a method, an apparatus, and/or a system. When the present invention is realized as software, components of the present invention are embodied as code segments for executing required operations. A program or the code segments can be stored in a processor-readable recording medium and transmitted as computer data signals combined with a carrier using a transmission medium or a communication network. The processor-readable recording medium is any data storage device that can store or transmit data, which can be thereafter read by a computer system. Examples of the processor-readable recording medium include electronic circuits, semiconductor memory devices, read-only memory (ROM), flash memory, erasable ROM, floppy disks, optical discs, hard discs, optical fiber media, and RF networks. The computer data signals include any signal, which can be propagated via transmission media such as electronic network channels, optical fibers, air, electronic fields, RF networks.

As described above, according to the present invention, a position, a velocity and acceleration profiles are adaptively generated in accordance with variations in a peripheral environment such as temperature, supply power, etc. in a seek control method using the multi-sinusoidal wave acceleration profile, so that the seek control can be performed precisely.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A seek control method for a hard disk drive using a multi-sinusoidal wave acceleration profile, the method comprising:
    calculating a seek time scaling (STC) related to a variation in a voice coil motor (VCM) driving current due to a variation in a peripheral environment;
    calculating an acceleration distance ratio (ALR) of an acceleration distance to a maximum seek distance without a coast mode according to the STC;
    calculating position profiles in an acceleration mode, the coast mode and a deceleration mode, respectively, using both the STC and the ALR; and
    performing a seek operation by generating an adjusted VCM driving current based on the position profiles and applying the adjusted VCM driving current to a VCM.

2. The seek control method according to claim 1, further comprising;
    calculating a coast speed and a coast period using the STC and the ALR;
    wherein the position profiles in the acceleration mode, the coast mode and the deceleration mode are calculated using an acceleration period, the acceleration distance, the coast speed and the coast period.

3. A computer-readable recording medium having a program to execute a seek control method thereon, the method comprising:
    calculating a seek time scaling (STC) related to variation in a voice coil motor (VCM) driving current due to variation in a peripheral environment;
    calculating an acceleration distance ratio (ALR) of an acceleration distance to a maximum seek distance without a coast mode according to the STC;
    calculating position profiles in an acceleration mode, the coast mode and a deceleration mode, respectively, using both the STC and the ALR; and
    performing a seek operation by generating the VCM driving current according to the position profiles and applying the VCM driving current to a VCM.

4. The recording medium according to claim 3, the method further comprising:
    calculating a coast speed and a coast period using the STC and the ALR;

wherein the position profiles in the acceleration mode, the coast mode and the deceleration mode are calculated using an acceleration period, the acceleration distance, the coast speed and the coast period.

5. A hard disk drive comprising:
- a disk storing information;
- a spindle motor rotating the disk;
- a head reading information from the disk;
- a voice coil motor (VCM) driving unit driving a VCM to move the head across the disk;
- a temperature and voltage detection unit detecting operational temperature and supply voltage for the hard disk drive; and
- a controller generating a VCM driving current to drive the VCM based on a multi-sinusoidal wave acceleration profile corresponding to a seek distance;
- wherein the controller performs a seek control method including calculating a seek time scaling (STC) related to variation in a voice coil motor (VCM) driving current due to variation in a peripheral environment by referring to a detection result of the temperature and voltage detection unit; calculating an acceleration distance ratio (ALR) of an acceleration distance to a maximum seek distance without a coast mode according to the STC; calculating position profiles in an acceleration mode, the coast mode and a deceleration mode, respectively, using both the STC and the ALR; and performing a seek operation by generating the VCM driving current according to the position profiles and applying the VCM driving current to a VCM.

6. The hard disk drive according to claim 5, wherein the seek control method further includes calculating a coast speed and a coast period using both the STC and the ALR, wherein the position profiles in the acceleration mode, the coast mode and the deceleration mode are calculated using an acceleration period, the acceleration distance, the coast speed and the coast period.

* * * * *